United States Patent [19]

Silvis et al.

[11] Patent Number: 4,672,102

[45] Date of Patent: Jun. 9, 1987

[54] POLYHYDROXY ETHERS CONTAINING SPIROBIINDANOLS

[75] Inventors: H. Craig Silvis; Ted A. Morgan, both of Midland, Mich.

[73] Assignee: The Dow Chemical Company, Midland, Mich.

[21] Appl. No.: 812,436

[22] Filed: Dec. 23, 1985

[51] Int. Cl.$^4$ ............................................. C08G 59/02
[52] U.S. Cl. ...................................... 528/97; 528/104
[58] Field of Search ................................. 528/97, 107

[56] References Cited

U.S. PATENT DOCUMENTS

| | | | |
|---|---|---|---|
| 2,754,285 | 7/1956 | Petropoulos | 528/97 |
| 2,947,760 | 8/1960 | Bruin et al. | 528/97 X |
| 3,256,347 | 6/1966 | Casale et al. | 528/97 X |
| 3,264,358 | 8/1966 | Webb et al. | 528/97 X |
| 3,384,617 | 5/1968 | Casale et al. | 528/97 X |
| 4,105,634 | 8/1978 | Hanson et al. | 528/104 X |

*Primary Examiner*—Earl Nielsen

[57] ABSTRACT

Polyhydroxy ethers containing spirobiinadanols are tough, soluble thermoplastics with high heat distortion temperatures relative to bisphenol A based materials. These materials could function as surface coating resins.

4 Claims, No Drawings

POLYHYDROXY ETHERS CONTAINING SPIROBIINDANOLS

BACKGROUND OF THE INVENTION

This invention relates to polyhydroxy ethers containing indanols and spirobiindanols. These polyhydroxy ethers are tough, soluble thermoplastics with high heat distortion temperatures, relative to bisphenol A based materials, which may find application as surface coating resins.

The reaction between aromatic diols and diglycidyl ethers is well established. In the articles entitled "Polyhydroxy Ethers. I. Effect of Structure on Properties of High Molecular Weight Polymers from Dihydric Phenols and Epichlorohydrin," the authors, Reinking, Barnabeo, and Hale, discuss the polyhydroxy ether of bisphenol A. (*Journal of Applied Polymer Science*, Vol. 7, pp. 2135–2144, 1963). The ether is formed by reacting bisphenol A with epichlorohydrin to yield the polyhydroxy ether of bisphenol A with the following repeating unit:

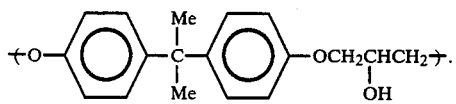

The article also discusses the use of connecting groups other than isopropyl in the bisphenol and their effect on the glass transition temperature of the polyhydroxy ethers. Such groups include

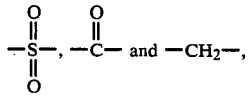

to name a few. The heat distortion temperature of the polyhydroxy ether of bisphenol A is 88° C. at 264 psi. The present invention allows for heat distortion temperatures of greater than the boiling point of water.

SUMMARY OF THE INVENTION

The present invention relates to polyhydroxy ethers containing indanols and spirobiindanols. To prepare these novel polyhydroxy ethers, a diglycidyl ether of a biphenol is reacted with an indanol or a spirobiindanol.

DETAILED DESCRIPTION OF THE INVENTION

Any diglycidyl ether of a biphenol may be employed for the purposes of this invention. The diglycidyl ether of the spirobiindanol and indanol having the general formulae, respectively

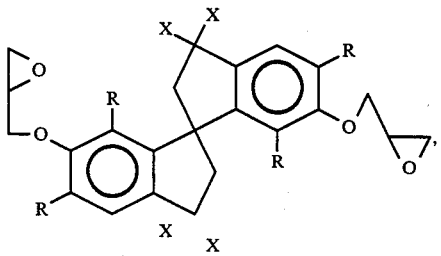

-continued
and

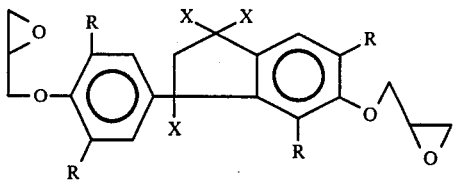

wherein R is selected from the group consisting of hydrogen, hydrocarbon radicals, halogen radicals, and mixtures thereof, and X is a linear alkyl hydrocarbon radical with a carbon chain length of 1 to 4 carbon atoms, may be employed. So far as is known at this time, the X radicals do not have to be identical for the purposes of this invention. It is preferred, however, that the diglycidyl ether have the general formula

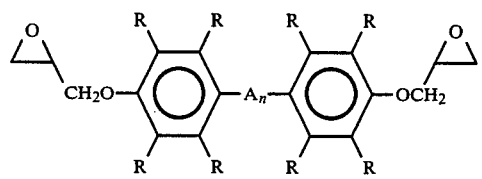

wherein R is selected from the group consisting of hydrogen, hydrocarbon radicals, halogen radicals, and mixtures thereof. Examples of suitable hydrocarbon radicals include alkyl radicals such as methyl, ethyl, isopropyl or butyl radicals; alkenyl radicals such as vinyl and allyl radicals; alkynyl radicals such as acetylene and propyne radicals; aryl radicals such as phenyl, naphthyl, and biphenyl radicals; and corresponding substituted hydrocarbon radicals such as chlorobutyl or nitromethyl radicals. Examples of suitable halogen radicals include chlorine and bromine. It is preferred, however, that the hydrocarbon radical be an alkyl radical with the methyl radical being optimal, and the halogen radical be the bromine radical. It is believed the substituents on the phenylene radicals do not have to be identical for the purposes of this invention. A is a hydrocarbon radical and n has a value of 0 to 1. Examples of suitable hydrocarbon radicals are as defined above. It is preferred, however, that A be the isopropyl radical.

It is further preferred that the diglycidyl ether be selected from the group consisting of

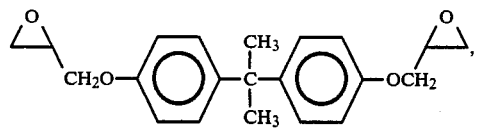

commonly known as the diglycidyl ether of bisphenol-A,

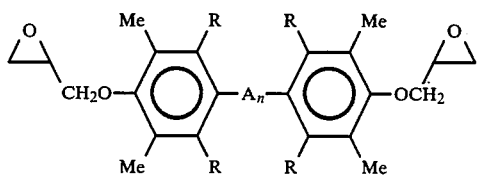

wherein R is selected from the group consisting of hydrogen, the chlorine radical, and the bromine radical, and mixtures thereof, and D.E.R. ®542, manufactured by The Dow Chemical Company, having the general formula

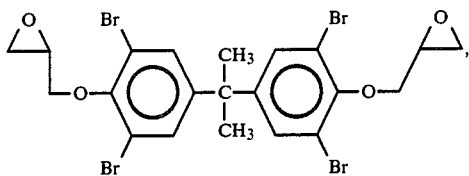

and mixtures thereof.

Any indanol or spirobiindanol may be employed for the purposes of this invention. It is preferred, however, that the indanol and spirobiindanol have the following formulae respectively:

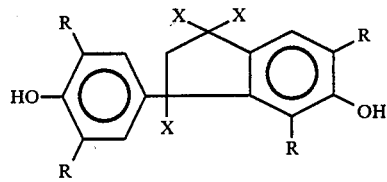

and

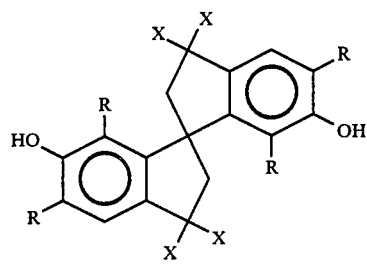

wherein R is selected from the group consisting of hydrogen, hydrocarbon radicals, halogen radicals, and mixtures thereof. Examples of suitable hydrocarbon radicals and halogen radicals are as defined above. It is preferred, however, that the hydrocarbon radical be an alkyl radical with the methyl radical being optimal, and the halogen radical be the bromine radical. It is believed the substituents on the phenylene radical do not have to be identical for the purposes of this invention. The X radical may be any linear alkyl hydrocarbon radical with a chain length of 1 to 4 carbon atoms. It is preferred that X be a methyl radical. It is believed the substituents on the indanol/spirobiindanol radicals do not have to be identical for the purposes of this invention.

Examples of suitable indanols and spirobiindanols, include:

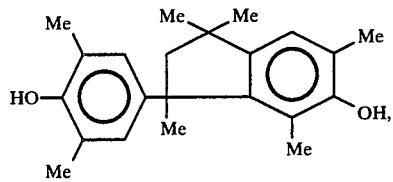

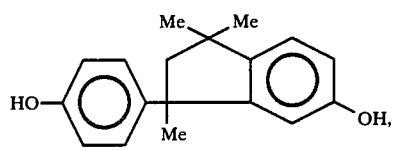

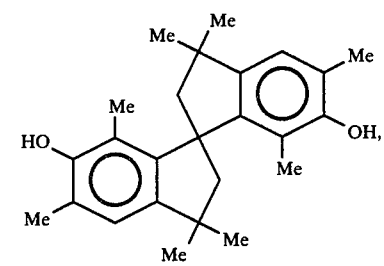

and

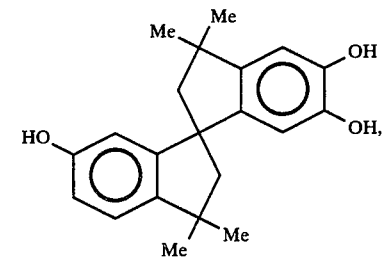

The resulting polyhydroxy ether may be selected from the following general repeating units:

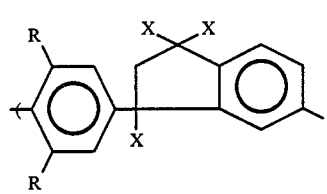 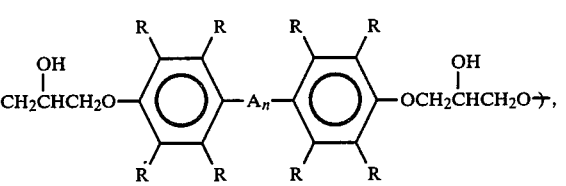

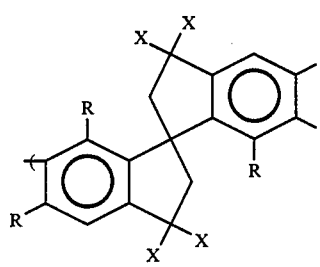 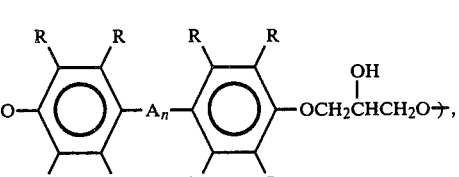

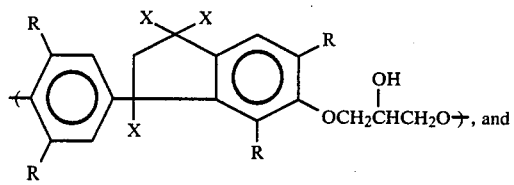, and 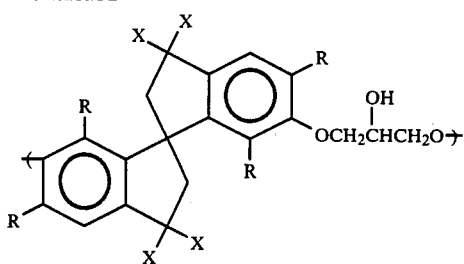

wherein R is selected from the group consisting of hydrogen, hydrocarbon radicals, halogen radicals, and mixtures thereof. Examples of suitable hydrocarbon and halogen radicals are as defined above. It is preferred that the hydrocarbon radical be an alkyl radical, with the methyl radical being optimal, and the halogen radical be the bromine radical. It is believed the substituents on the phenylene radicals do not have to be identical for the purposes of this invention. The X radical may be any linear alkyl hydrocarbon radial with a carbon chain length of 1 to 4 carbon atoms. So far as is known at this time, the X radicals need not be identical for the purposes of this invention. It is preferred, however, that X be a methyl radical. A is a hydrocarbon radical and n has a value of zero to 1. Examples of suitable hydrocarbon radicals are as defined above. It is preferred that A be the isopropyl radical.

Examples of polyhydroxy ethers of the present invention include:

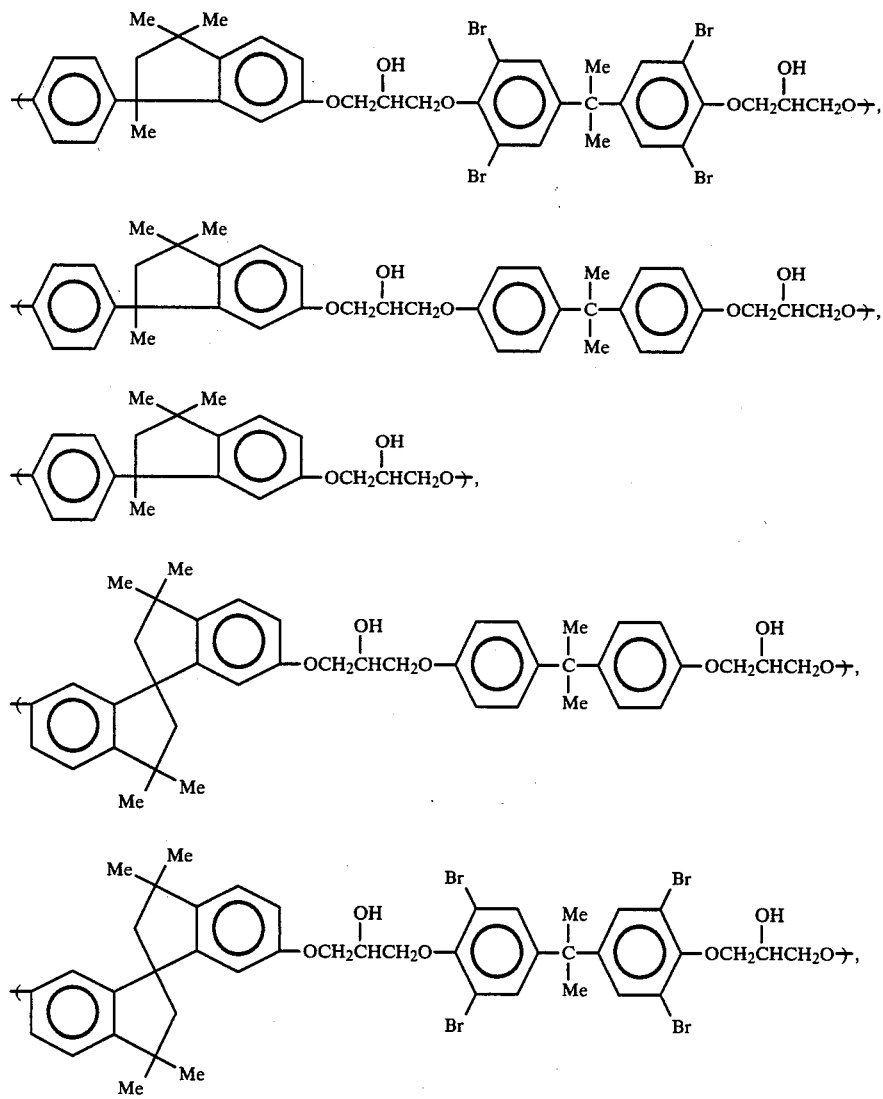

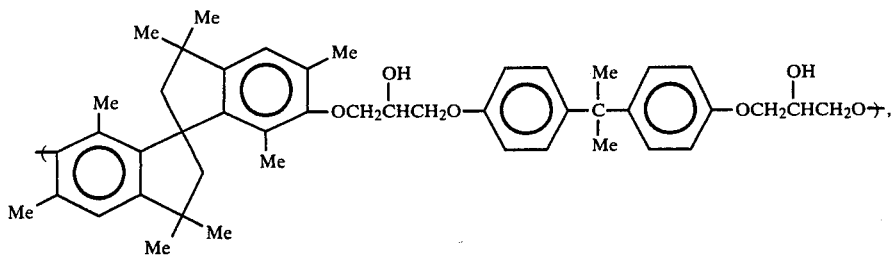

and

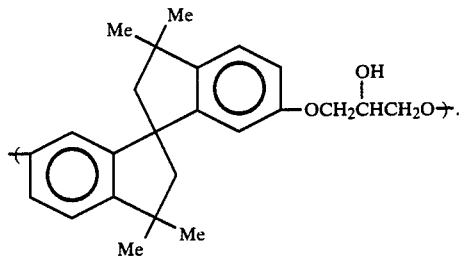

Fractionation of the polyhydroxy ether is required to obtain optimal molecular weights. Fractionation may be carried out in any solvent which gives the desired results. Suitable solvents include methanol and ethanol. A linear, high molecular weight resulting polyhydroxy ether is optimal.

The reaction between the diglycidyl ether and the indanol/spirobiindanol to form the polyhydroxy ether is carried out via a solution process. So far as is known at this time, any solution process is feasible. It appears suitable solvents are those which are polar in nature and substantially inert in a basic medium. Examples of suitable solutions include dioxanes, dimethyl acetamide, methyl isobutyl ketone, methyl ethyl ketone, N-methylpyrrolidinone, methyl ethers and ethanols. These examples, however, are given by way of illustration only, and not by way of limitation. It is preferred, however, that the solution be hot and be selected from the group consisting of 2-ethoxyethanol, p-dioxane, and mixtures thereof. Other preferred solvents include dipropyleneglycol methyl ethers, 2-butoxyethanol, and N-methylpyrrolidinone. Use of such solvents aid in controlling reaction exotherm which shortens catalyst lifetime and promotes branching. In the preparation of the polyhydroxy ethers, a 2 mole percent excess of the diglycidyl ether is required to obtain optimal molecular weights and to compensate for a competing side reaction that consumes epoxide. The slight excess allows the diol and the epoxide to remain stoichiometrically equivalent during the latter stages of the reaction.

The polyhydroxy ethers of the present invention have been found to be useful in thermoforming processes such as extruded films, packaging, and coatings. The polyhydroxy ethers may find use in the manufacture of articles such as combs, brush handles, garden furniture, radio cabinet parts, structural parts requiring high heat distortion temperatures, insulation of electrical parts, and protective coatings. The compositions may be cast or molded using simplified procedures. These compositions are particularly useful in making high temperature structural parts for the aircraft industry, and tools and dies such as those used in the automobile industry for stamping fenders, hoods and other automobile body parts. The compositions may also find use as adhesives. If needed, fillers may be added.

Now, in order that those skilled in the art may better understand how the present invention can be practiced, the following examples are given by way of illustration and not by way of limitation.

EXAMPLE 1

To a 100 ml resin kettle containing 3.004 g of the indanol of the formula

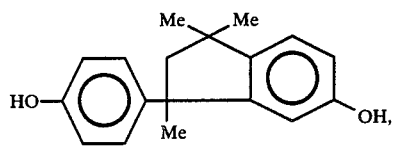

7.545 g of the diglycidyl ether having the general formula

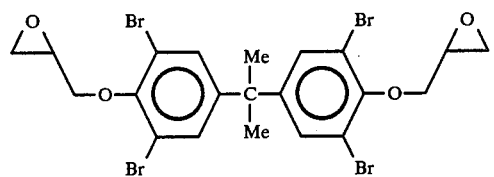

and 0.030 g of $Ph_3BuP^+HCO_3^-$ (the catalyst), 15 ml of Dowanol ®EE (2-ethoxyethanol, manufactured by The Dow Chemical Company) was added. The flask was fitted with a mechanical overhead stirrer and purged with dry nitrogen. This mixture was heated to reflux temperature (130° C.), at which point all reactants were in solution. The reaction was allowed to proceed for about 20 hours with gradual additions of 1-2 ml of the Dowanol ®EE solvent to compensate for viscosity build-up. After cooling, the reaction solution was poured into excess methanol in order to precipitate the polymer. The product was redissolved in tetrahydrofuran and precipitated in methanol two additional times. After drying in vacuo, the yield of polymer was 7.4 g (70 percent). The glass transition temperature of the material, measured by differential scanning calorimetry, was 142° C. The glass transition temperature of the bisphenol A based material is about 100° C. The weight average molecular weight was 102,000, relative to polystyrene standards. The resulting polyhydroxy ether had the general repeating unit

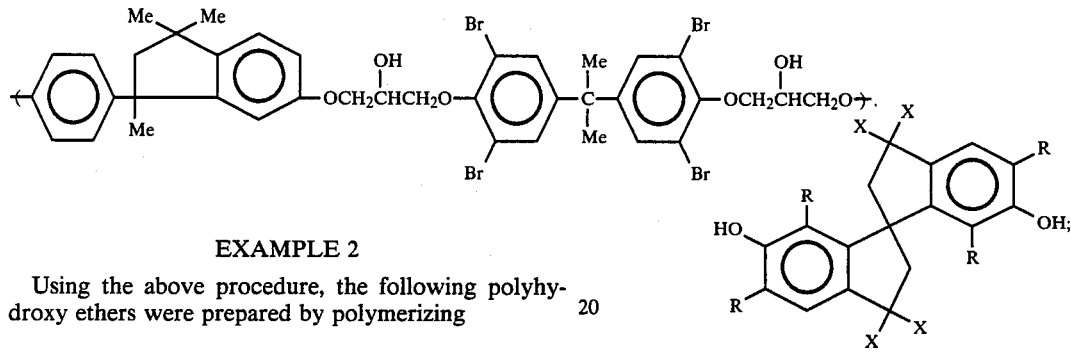

EXAMPLE 2

Using the above procedure, the following polyhydroxy ethers were prepared by polymerizing

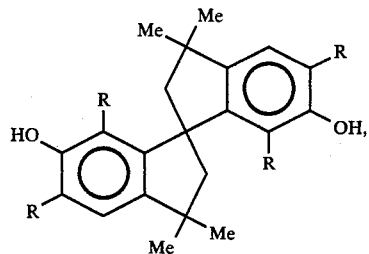

wherein R is selected from the group consisting of hydrogen and the methyl radical, with the diglycidyl ethers of bisphenol A (D.E.R. ®332, manufactured by The Dow Chemical Company) and tetrabromobisphenol A (D.E.R. ®542, manufactured by The Dow Chemical Company) to yield high molecular weight thermoplastics of the general structure:

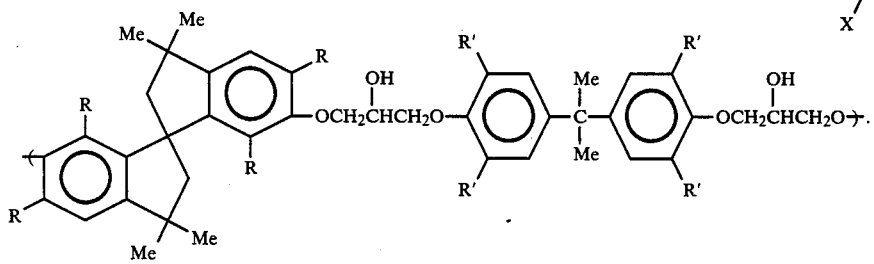

The results were as follows:

| R  | R' | Tg, °C. | Mw (Relative to PS) |
|----|----|---------|---------------------|
| H  | H  | 131     | 122,000             |
| H  | Br | 153     | 55,000              |
| Me | H  | 147     | 47,000              |

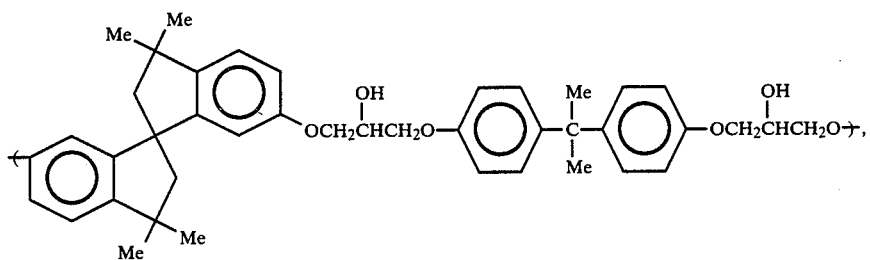

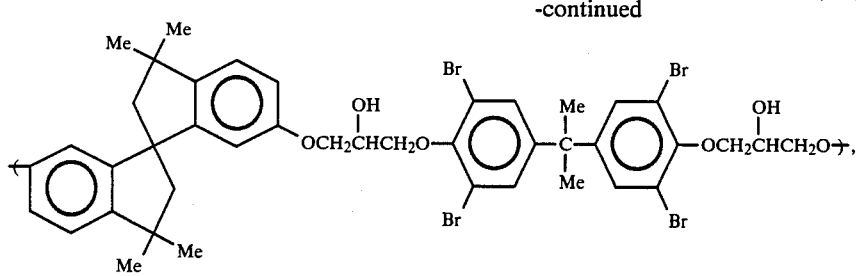
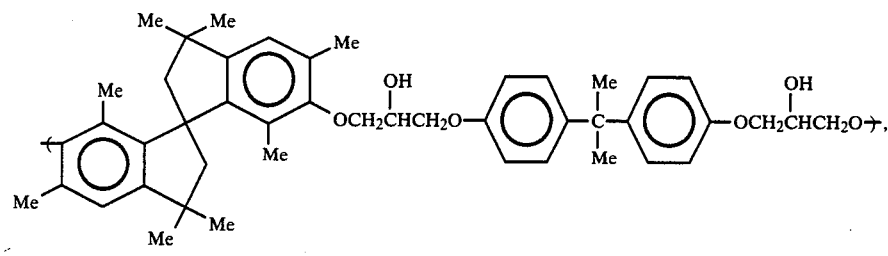
and
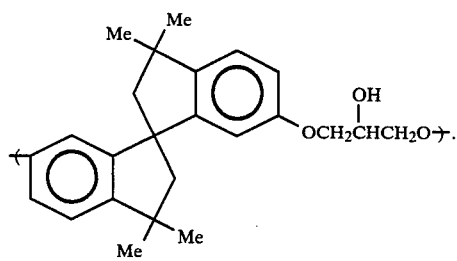

What is claimed is:

1. A polyhydroxy ether comprising the reaction product of a spirobiindanol and diglycidyl ether of a biphenol.

2. Polyhydroxy ethers as defined in claim 1 wherein the spirobiindanol has the general formula

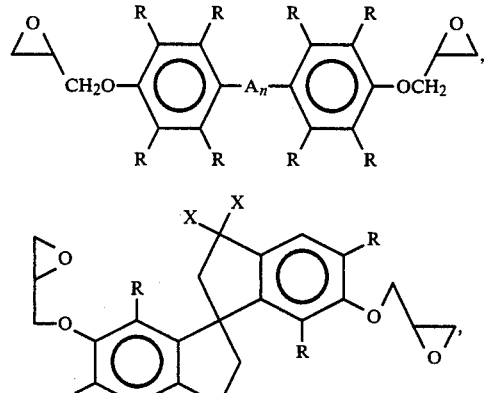

the diglycidyl ether is selected from the group consisting of

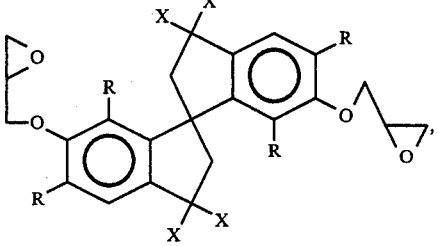

and

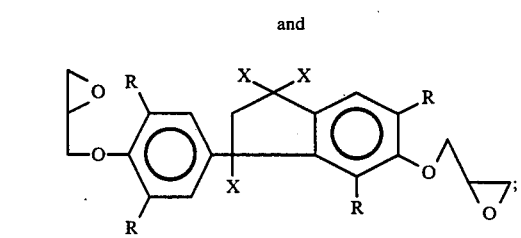

and the polyhydroxy ether's general repeating unit is selected from the group consisting of

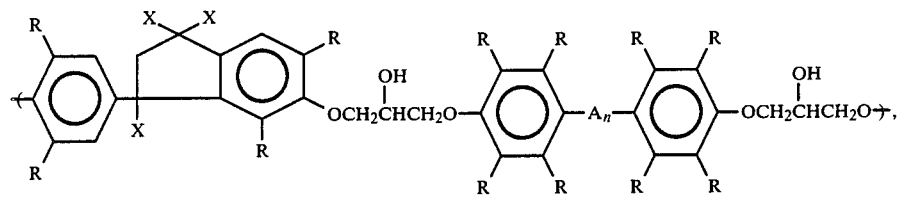

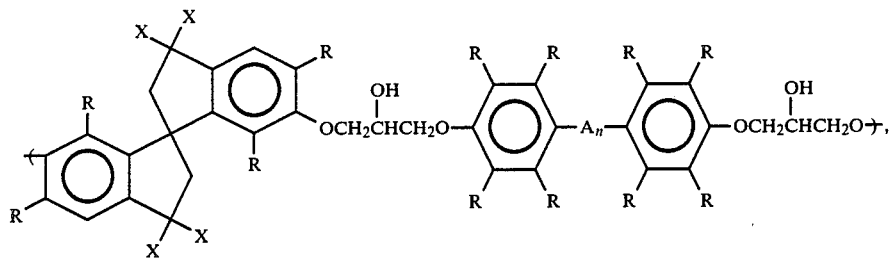

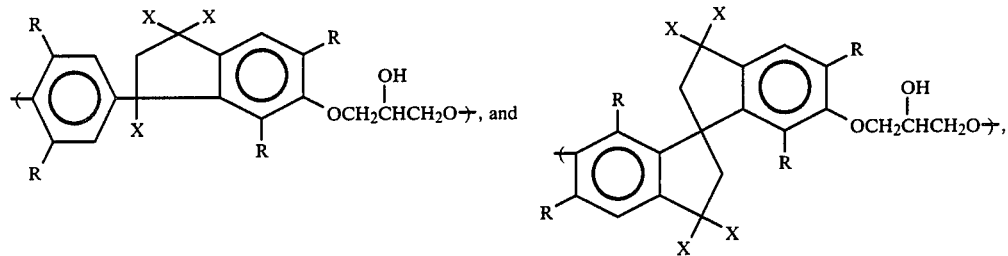

wherein R is selected from the group consisting of hydrogen, hydrocarbon radicals, halogen radicals, and mixtures thereof, X is a linear hydrocarbon radical with a 1 to 4 carbon chain length, A is a hydrocarbon radical, and n has a value of 0 to 1.

3. The polyhydroxy ethers as defined in claim 2 and the spirobiindanol is selected from the group consisting of

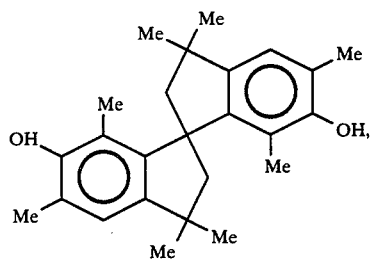

-continued and

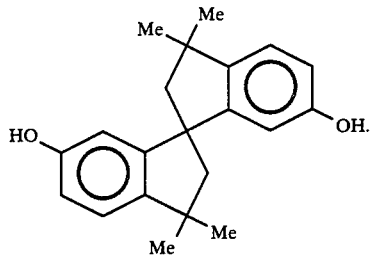

4. The polyhydroxy ethers as defined in claim 2 wherein the repeating unit is selected from the group consisting of